US012621210B2

(12) United States Patent
Singh et al.

(10) Patent No.: US 12,621,210 B2
(45) Date of Patent: May 5, 2026

(54) NETWORK SERVICE DEPLOYMENT METHOD AND SYSTEM

(71) Applicant: Rakuten Mobile, Inc., Tokyo (JP)

(72) Inventors: Satyanarayan Singh, Indore (IN); Adesh Mittal, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 267 days.

(21) Appl. No.: 17/996,222

(22) PCT Filed: Jul. 29, 2022

(86) PCT No.: PCT/US2022/038806
§ 371 (c)(1),
(2) Date: Oct. 14, 2022

(87) PCT Pub. No.: WO2024/025552
PCT Pub. Date: Feb. 1, 2024

(65) Prior Publication Data
US 2024/0223457 A1      Jul. 4, 2024

(51) Int. Cl.
*G06F 15/177*      (2006.01)
*H04L 41/0813*      (2022.01)
*H04L 41/084*      (2022.01)
*H04L 41/0895*      (2022.01)

(52) U.S. Cl.
CPC ...... *H04L 41/0895* (2022.05); *H04L 41/0813* (2013.01); *H04L 41/0843* (2013.01)

(58) Field of Classification Search
CPC ............ H04L 41/0895; H04L 41/0813; H04L 41/0843
See application file for complete search history.

(56) References Cited

U.S. PATENT DOCUMENTS

| | | | |
|---|---|---|---|
| 2019/0238425 A1 | 8/2019 | Mladin et al. | |
| 2020/0396140 A1* | 12/2020 | Bhatia | H04L 41/5045 |
| 2021/0019173 A1* | 1/2021 | Song | H04L 41/0654 |
| 2022/0035650 A1* | 2/2022 | Banerjee | H04L 12/4641 |
| 2022/0342718 A1* | 10/2022 | Iqbal | H04L 67/63 |
| 2022/0350367 A1* | 11/2022 | Kim | G06F 1/1624 |
| 2022/0350637 A1* | 11/2022 | Wu | H04L 41/0843 |

* cited by examiner

*Primary Examiner* — Duyen M Doan
(74) *Attorney, Agent, or Firm* — HAUPTMAN HAM, LLP

(57) ABSTRACT

A computer-implemented method includes generating initial features of a network service template (NST), integrating a cloud-native network function (CNF) of the NST with an internet protocol (IP) address manager, integrating the CNF with a unique host name (UHN) manager, defining details of each role of a plurality of roles of the CNF, and storing the NST in a storage device.

17 Claims, 10 Drawing Sheets

200

210
Create a network service descriptor

220
Generate initial features of a network service template (NST)

230
Integrate a cloud-native function (CNF) of the NST with an IP address manager 240
Integrate the CNF with a UHN manager 250
Link the CNF to a server cluster 260
Link the CNF to a container image 270
For each CNF role, define details possibly including IP pool and DNS information 280
Repeat operations 230-270 as needed and store the NST in a storage device 290
Deploy an application using the stored NST

200

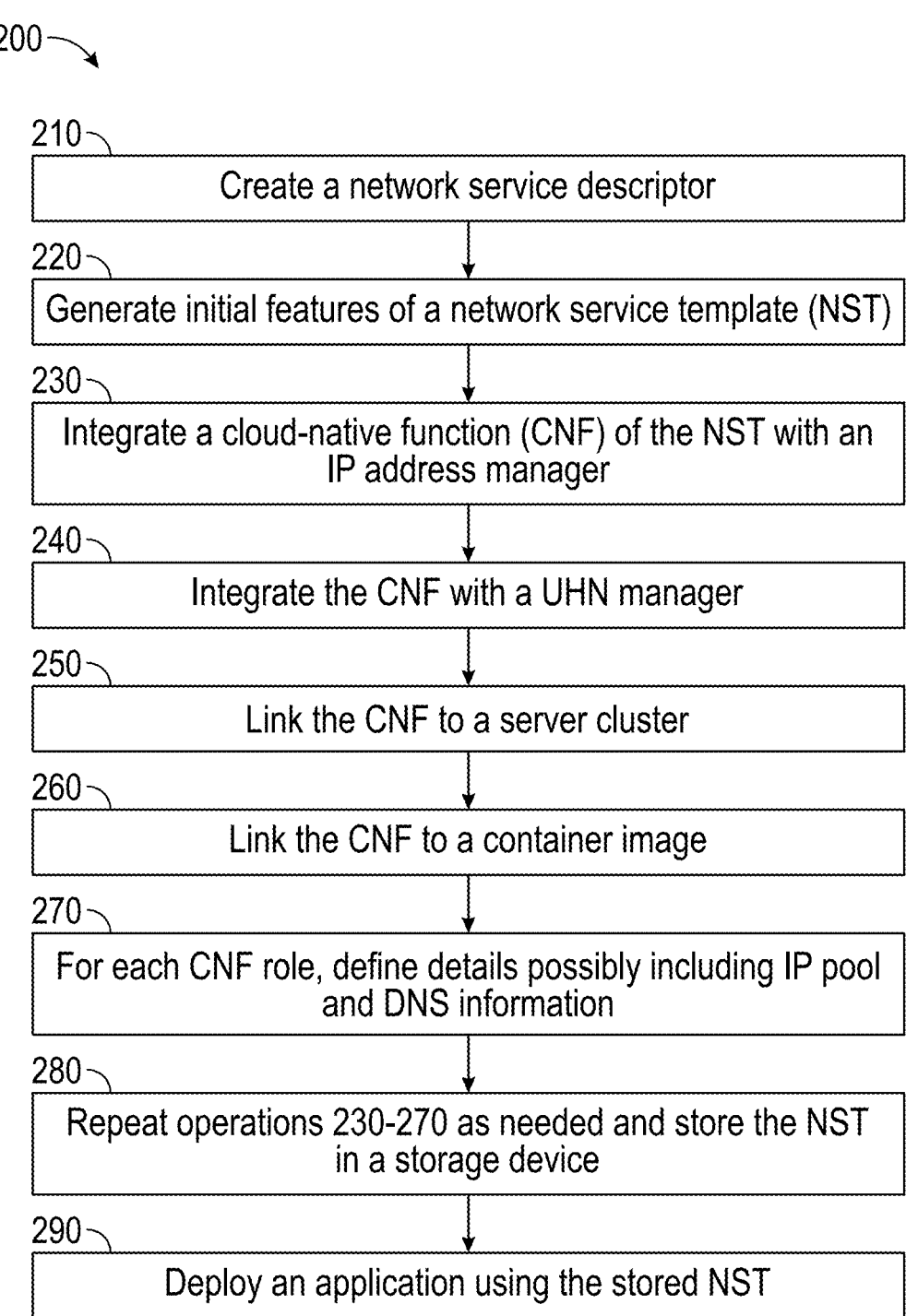

210

Create a network service descriptor

220

Generate initial features of a network service template (NST)

230

Integrate a cloud-native function (CNF) of the NST with an IP address manager

240

Integrate the CNF with a UHN manager

250

Link the CNF to a server cluster

260

Link the CNF to a container image

270

For each CNF role, define details possibly including IP pool and DNS information

280

Repeat operations 230-270 as needed and store the NST in a storage device

290

Deploy an application using the stored NST

Figure 3A:
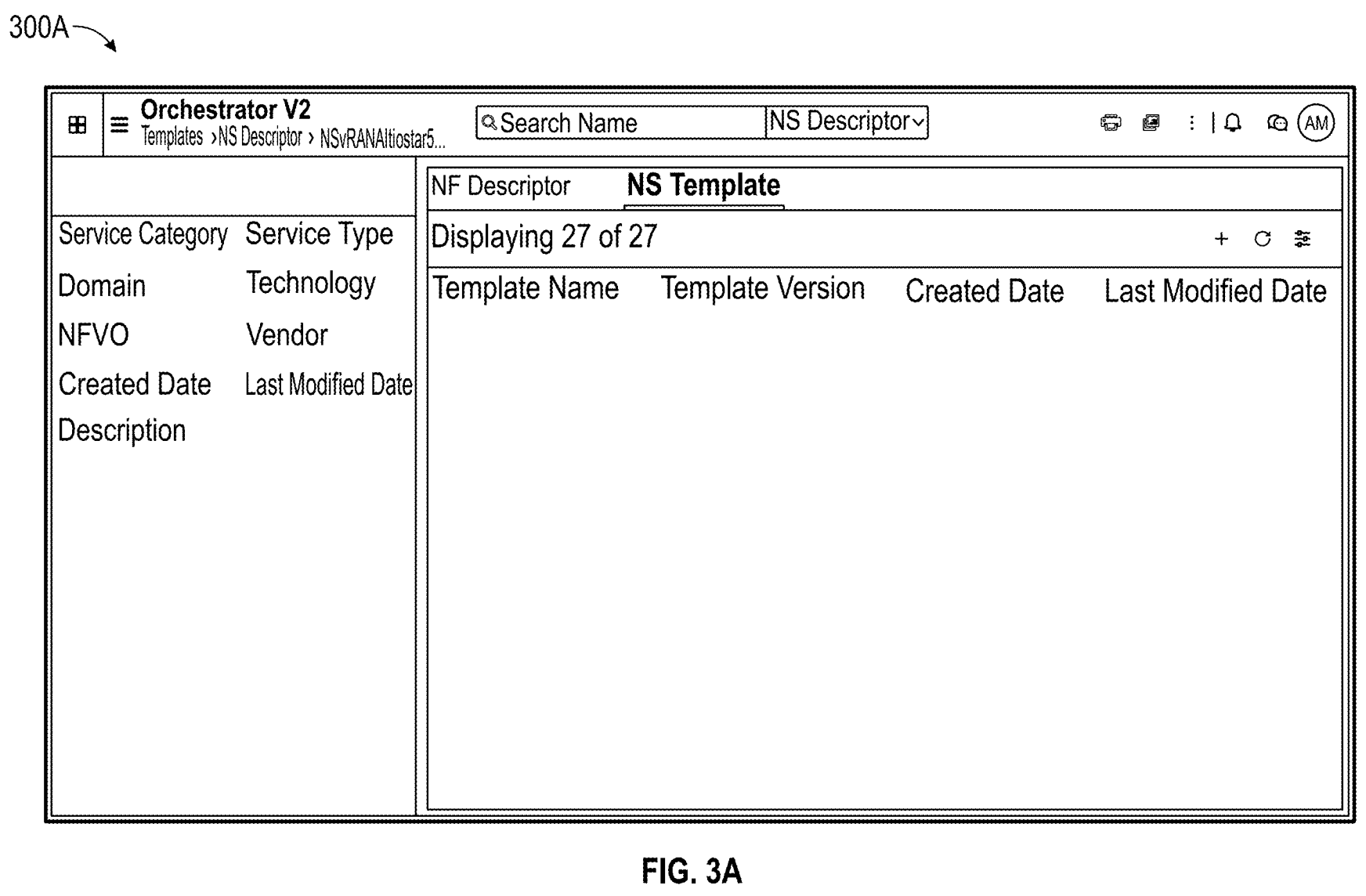

≡ Orchestrator V2
Templates ›NS Descriptor › NSvRANAltiostar5...

🔍 Search Name    |NS Descriptor⌄|

🖥 📑 📑 ⋮ ↻ ⊚ ⊚ (AM)

NF Descriptor    NS Template

Displaying 27 of 27                                                + ↻ ⇞

Service Category    Service Type          Template Name    Template Version    Created Date    Last Modified Date Domain              Technology NFVO                Vendor Created Date        Last Modified Date Description

NETWORK SERVICE DEPLOYMENT METHOD AND SYSTEM

RELATED APPLICATIONS

The present application is a National Phase of International Application No. PCT/US2022/038806, filed Jul. 29, 2022.

BACKGROUND

Network functions virtualization (NFV) is a network architecture concept that leverages virtualization technologies to virtualize entire classes of network node functions into building blocks that connect, or chain together, to create and deliver communication services. NFV is based upon traditional server-virtualization techniques such as those used in enterprise information technology (IT). A virtualized network function (VNF) is typically implemented within one or more virtual machines (VMs) or containers running different software and processes, on top of commercially available off-the-shelf (COTS) high-volume servers, switches, and storage devices, or even cloud computing infrastructure, instead of having custom hardware appliances for each network function. The decoupling of the network function software from the customized hardware platform realizes a flexible network architecture that enables agile network management. A cloud-native network function (CNF) is a software-implementation of a network function traditionally performed by a physical device and typically runs inside a container, e.g., a Linux container.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

FIG. 2 is a flowchart of a network service deployment method, in accordance with some embodiments.

FIGS. 3A-3F are non-limiting examples of graphical user interfaces, in accordance with some embodiments.

DETAILED DESCRIPTION

Figure 1A:
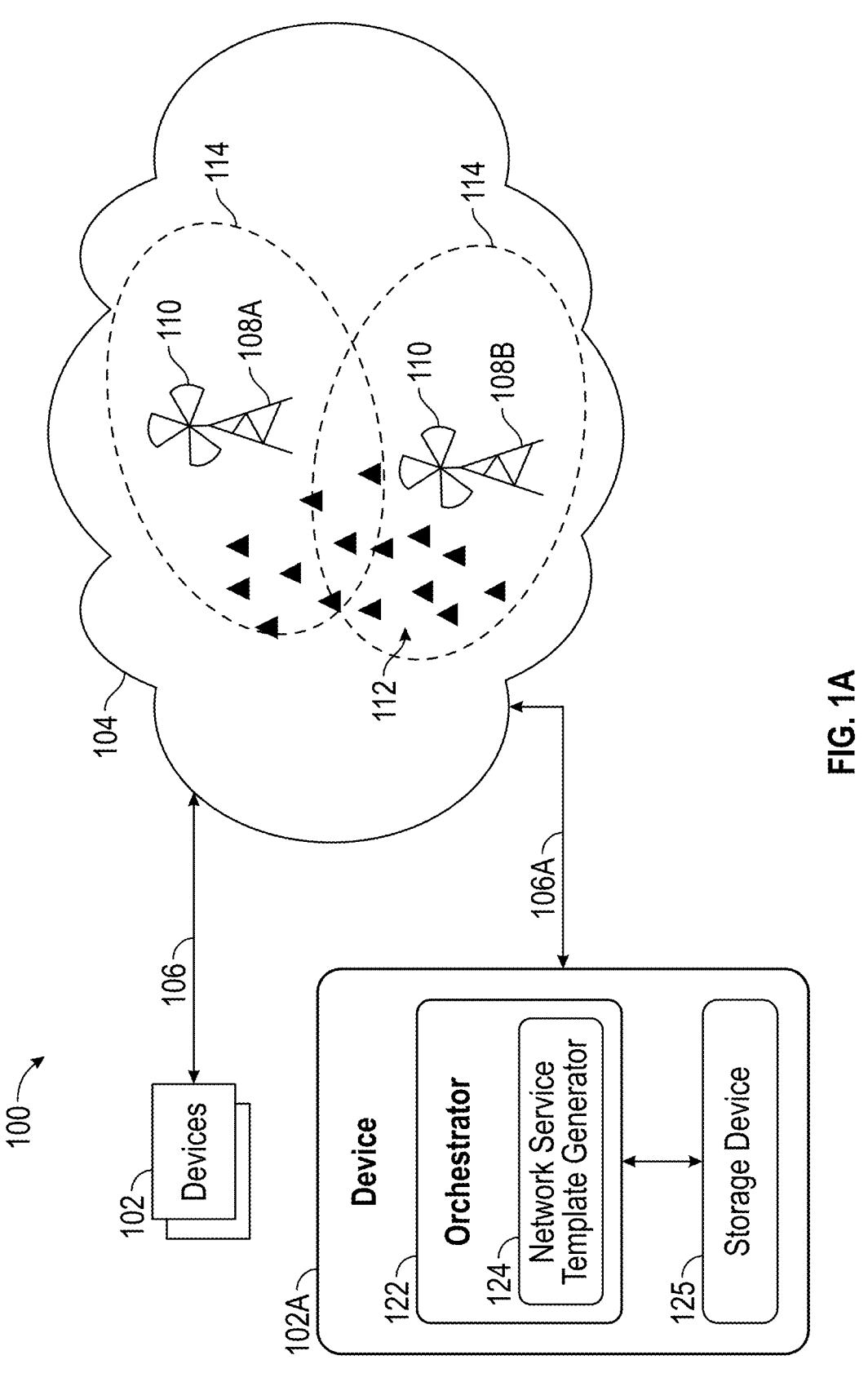
FIGS. 1A and 1B are block diagrams of a communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, a method, apparatus, and computer readable medium are directed to automatically generating initial features of a network service template (NST), integrating a cloud-native network function (CNF) of the NST with an internet protocol (IP) address manager, integrating the CNF with a unique host name (UHN) manager, defining details of each role of a plurality of roles of the CNF, and storing the NST in a storage device. In some embodiments, the CNF is one CNF of multiple CNFs of the NST, each CNF is integrated with the IP address manager and UHN, and the details of the plurality of roles of each CNF are defined. In some embodiments, a given CNF is linked to one or both of a server cluster or a container image and/or the CNF role details include IP pool and domain name system (DNS) information. In some embodiments, the stored NST is used to deploy an application.

Figure 1B:
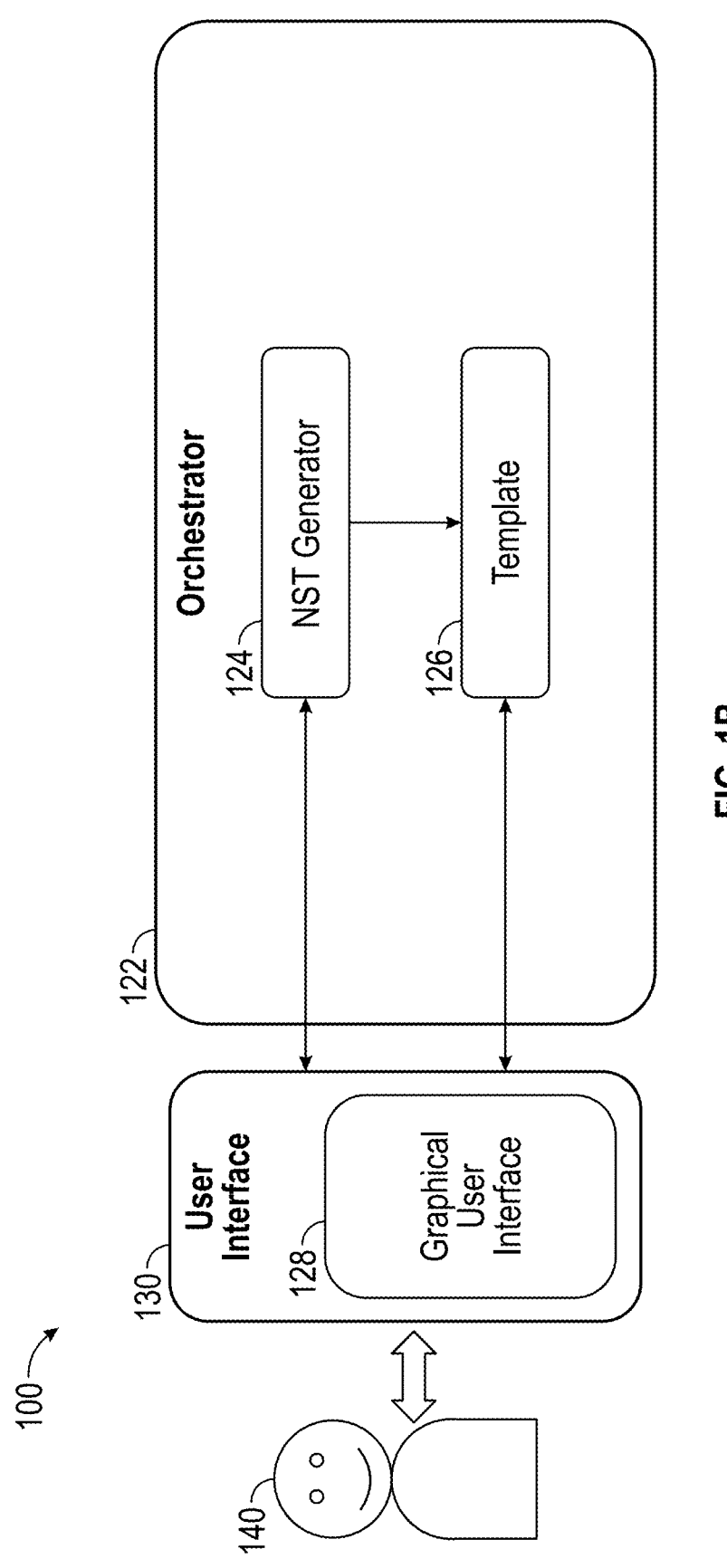

FIGS. 1A and 1B are block diagrams of a communication system 100 (hereinafter referred to as "system 100"), in accordance with some embodiments.

System 100 includes a plurality of devices 102 coupled to a network 104 by a plurality of links 106. Network 104 is coupled to a device 102A of plurality of devices 102 by a link 106A of plurality of links 106. Plurality of devices 102 including device 102A are coupled to each other through network 104 and plurality of links 106 including link 106A.

Figure 4:
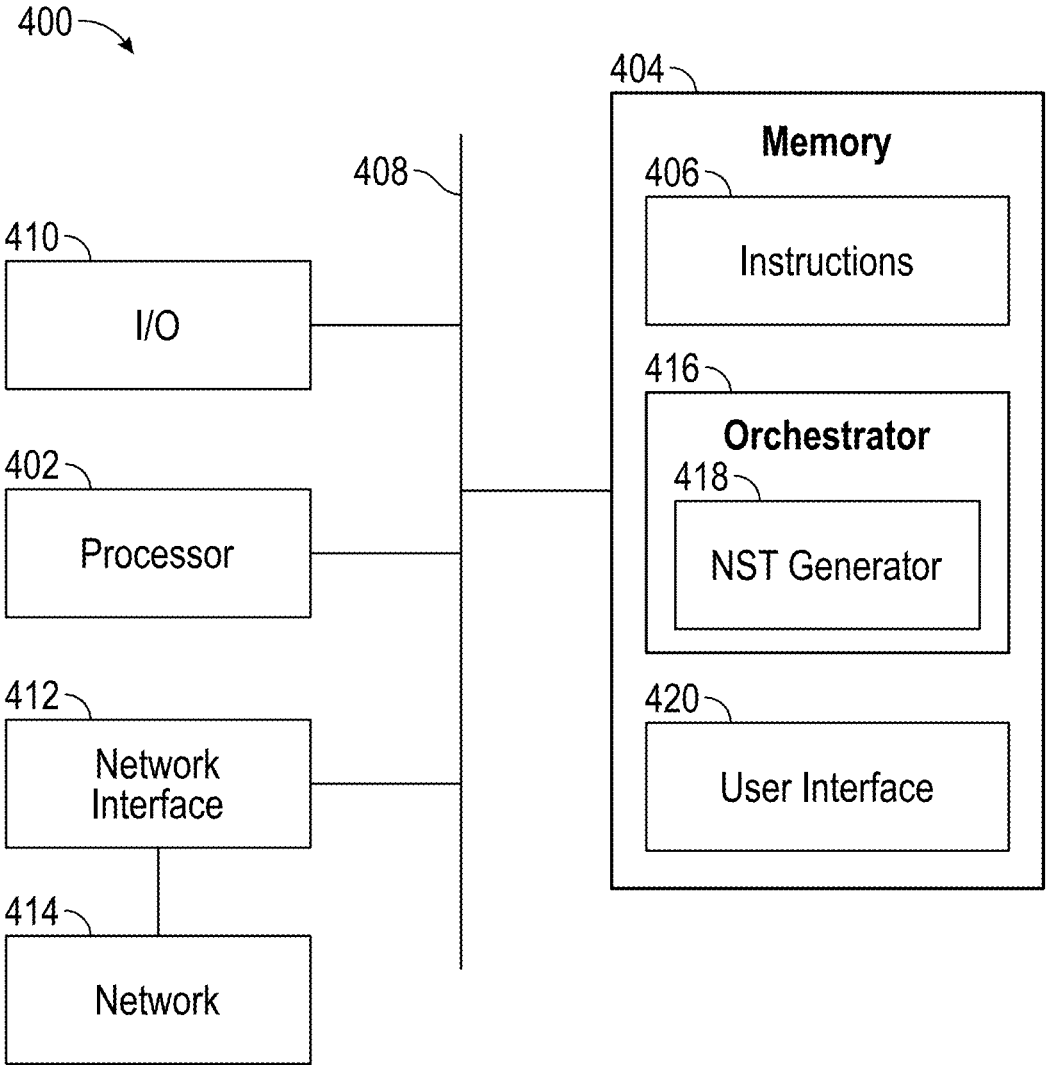
FIG. 4 is a diagram of a network configuration system, in accordance with some embodiments.

In various embodiments, the devices of plurality of devices 102 correspond to combinations of computing devices, computing systems, servers, server clusters, and/or pluralities of server clusters also referred to as server farms or data centers in some embodiments. In some embodiments, a system 400 discussed below with respect to FIG. 4 is an embodiment of one or more of plurality of devices 102.

In some embodiments, one or more of plurality of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of plurality of devices 102 includes a display by which a user interface is displayed.

Other configurations and/or types of devices in plurality of devices 102 are within the scope of the present disclosure.

In the embodiment depicted in FIG. 1A, device 102A includes an orchestrator 122 including a NST template generator 124, and a storage device 125, each discussed below.

Network 104 is one or more interconnected devices configured to provide electronic communications between and among the interconnected devices and plurality of devices 102, in some cases through plurality of links 106. In some embodiments, network 104 corresponds to the internet.

In some embodiments, network 104 includes or represents a radio-access network (RAN), a mobile telecommunication system that implements a radio access technology and resides between devices such as mobile phones, computers, or other devices and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone or core network (CN), a part of a computer network which interconnects networks, providing a path for the exchange of information between different LANs, WANs, etc.

In some embodiments, some of the interconnected devices of network 104 and/or plurality of devices 102 are configured as server clusters, e.g., included in a data center. In some embodiments, the server clusters are part of a cloud computing environment.

In the embodiment depicted in FIG. 1A, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between user equipment 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UE 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, a base stations 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of metropolitan area network (MAN) and wide area network (WAN) access devices.

In at least one embodiment, an instance of antenna 110 is a sector antenna, e.g., a directional microwave antenna with a sector-shaped radiation pattern, or a plurality of sector antennae, e.g., configured to have a full-circle coverage. In some embodiments, an instance of antenna 110 is a circular antenna. In some embodiments, an instance of antenna 110 operates at microwave or ultra-high frequency (UHF) frequencies (300 MHz to 3 GHZ).

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and Global Positioning System (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In various embodiments, a geographic coverage area 114, also referred to as a cell 114 in some embodiments, is a three-dimensional space having a shape and size based on the configurations of the corresponding base station 108, e.g., a power level, and antenna 110, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antenna sectors.

In some embodiments, a user of network 104, e.g., a user of one of plurality of devices 102, accesses network 104 through a service provider, a business or organization that sells bandwidth or network access by providing direct internet backbone access to internet service providers and usually access to its network access points (NAPs). Service providers are sometimes referred to as backbone providers or internet providers. Service providers consist of telecommunications companies, data carriers, wireless communications providers, internet service providers, and cable television operators offering high-speed internet access.

Plurality of links 106 include hardware configured to enable electronic communications between plurality of devices 102 and network 104. In various embodiments, one or more of plurality of links 106 is a wired link, e.g., fiber optic, shielded, twisted-pair, or other cabling, or a wireless link type.

In various embodiments, one or more of plurality of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

In the embodiment depicted in FIGS. 1A and 1B, device 102A including orchestrator 122 is a single instance of plurality of devices 102. In some embodiments, device 102A including orchestrator 122 includes one or more instances of plurality of devices 102.

An orchestrator, e.g., orchestrator 122, is one or more sets of instructions configured to perform automated configuration, coordination, and management of computer systems and software as related to service-oriented architecture, virtualization, provisioning, converged infrastructure, and dynamic datacenter topics, e.g., by aligning business-based requests with applications, data, and infrastructure of the computer systems and software. In the context of cloud computing, the main difference between workflow automation and orchestration is that workflows are processed and completed as processes within a single domain for automation purposes, whereas orchestration includes a workflow and provides a directed action towards larger goals and objectives. In the cloud computing context, an orchestrator is configured to perform cloud management solutions encompassing frameworks for workflow mapping and management with an overall aim of achieving specific goals and objectives, e.g., by meeting application performance goals using minimized cost and maximized application performance within budget constraints. In some embodiments, an orchestrator is also referred to as a virtual network function (VNF) orchestrator, a CNF orchestrator, a network function virtualization (NFV) orchestrator, or a VNF, CNF, or NFV manager.

In operation, an orchestrator is configured to manage lifecycles of instances of VNFs and CNFs driven by the contents of descriptors and templates, files that include instantiation parameter and operational behavior information, e.g., resource requirements, networking, day zero configuration, key performance indicator (KPI) monitoring, placement policies, lifecycle stages, and scaling rules. Descriptors can include a network function descriptor (NFD) or network service descriptor (NSD) and templates can include a NST such as template 126 discussed below.

NST generator 124 is one or more sets of instructions configured to run within orchestrator 122 such that one or more templates 126 are generated and stored in storage device 125 in accordance with method 200 discussed below. In some embodiments, NST generator 124 is configured to run as a standalone program or within one or more sets of instructions other than an orchestrator such as orchestrator 122. In some embodiments, NST generator 124 runs on a device of plurality of devices 102 other than device 102A on which orchestrator 122 runs.

Storage device 125 is one or more computer-readable, non-volatile storage devices, e.g., a memory 404 discussed below with respect to FIG. 4, or a database. In the embodiment depicted in FIG. 1A, storage device 125 is included in device 102A. In some embodiments, storage device 125 is included in one or more devices other than device 102A, e.g., one or more servers or server clusters.

Device 102A includes user interface 130 through which one or more users 140 (represented collectively as user 140 in FIG. 1B) interact with NST generator 124. In various embodiments, the interactions include one or more of a user 140 communicating information, uploading files, or submitting instructions to NST generator 124, or NST generator 124 providing information to the user 140. In some embodiments, device 102A is configured to operate user interface 130 using a set of instructions such as a user interface 420 discussed below with respect to FIG. 4.

In the embodiment depicted in FIG. 1B, user 140 interacts with NST generator 124 through device 102A and a single instance of user interface 130. In various embodiments, user 140 interacts with NST generator 124 through one or more of devices 102 instead of or in addition to device 102A, e.g., through multiple instances of user interface 130.

User 140 interacts with NST generator 124 and user interface 130 through a graphical user interface (GUI) 128, one or more sets of instructions configured to facilitate the interactions through user interface 130. In some embodiments, GUI 128 includes one or more of non-limiting example GUIs 300A-300F discussed below with respect to FIGS. 3A-3F.

Template 126 is one or more files generated by NST generator 124 based on information included in the interactions between user 140 and NST generator 124 through GUI 128 and user interface 130. The one or more files are configured to automatically deploy instances of one or more cloud-based network services, also referred to as applications in some embodiments, in accordance with template 126 as configured by NST generator 124 according to method 200 discussed below.

In some embodiments, template 126 is configured to be compatible with multiple orchestrator types. In some embodiments, template 126 is configured to conform to one or more industry standards.

Template 126 is configured to deploy the instances on corresponding containers. A container is one or more sets of instructions configured to run on one or more server clusters and in turn enable execution of a plurality of virtualized network functions by functioning as a virtual operating system, also referred to as an image, such that the plurality of virtualized network functions effectively run on the one or more server clusters.

By the configuration discussed above, communication system 100 including NST generator 124 is configured to generate and store template 126 in accordance with method 200 whereby application instances including the corresponding configuration information are capable of being automatically deployed. Compared to other approaches, communication system 100 is thereby capable of operating more efficiently, and the network functions are more fully utilized such that overall operation of communication system 100 is improved.

FIG. 2 is a flowchart of network service deployment method 200, in accordance with some embodiments. Network service deployment method 200, also referred to as method 200 in some embodiments, is operable on a communication system, e.g., communication system 100 discussed above with respect to FIGS. 1A and 1B.

Additional operations may be performed before, during, between, and/or after the operations of method 200 depicted in FIG. 2, and some other operations may only be briefly described herein. In some embodiments, other orders of operations of method 200 are within the scope of the present disclosure. In some embodiments, one or more operations of method 200 are not performed. In some embodiments, the operations of method 200 are included in another method, e.g., a method of operating an orchestrator.

In some embodiments, some or all of the operations of method 200 discussed below are capable of being performed automatically, e.g., by NST generator 124 discussed above with respect to FIGS. 1A and 1B and/or by using processing circuitry 402 discussed below with respect to FIG. 4.

At operation 210, in some embodiments, a NSD is created. Creating the NSD includes receiving user information from a user interface, e.g., user interface 130 discussed above. In some embodiments, creating the NSD includes receiving the user information includes using a blank form or editing an existing NSD retrieved from a storage device.

In some embodiments, creating the NSD includes creating the NSD including one or more of a descriptor name, a descriptor version, a service category, a service type, a domain and/or technology indicator, or the like.

At operation 220, initial features of a NST are generated. In some embodiments, generating the initial features of the NST includes generating at least one initial feature from the NSD, e.g., by selecting the NSD from a list. In some embodiments, generating at least one initial feature from the NSD includes generating one or more of the NSD name or a vendor or domain identifier in the NST. In some embodiments, generating the initial features of the NST includes receiving a user selection to initiate a GUI, e.g., GUI 300A depicted in FIG. 3A.

In some embodiments, generating the initial features of the NST includes receiving user information including one or more of a template name, a display name, or an identifier of an orchestrator, e.g., a virtual network function manager. In some embodiments, the orchestrator is orchestrator 122 discussed above. In some embodiments, receiving the identifier of the orchestrator includes receiving user information identifying the orchestrator based on the user making a selection from a list of suitable orchestrators.

Figure 3B:
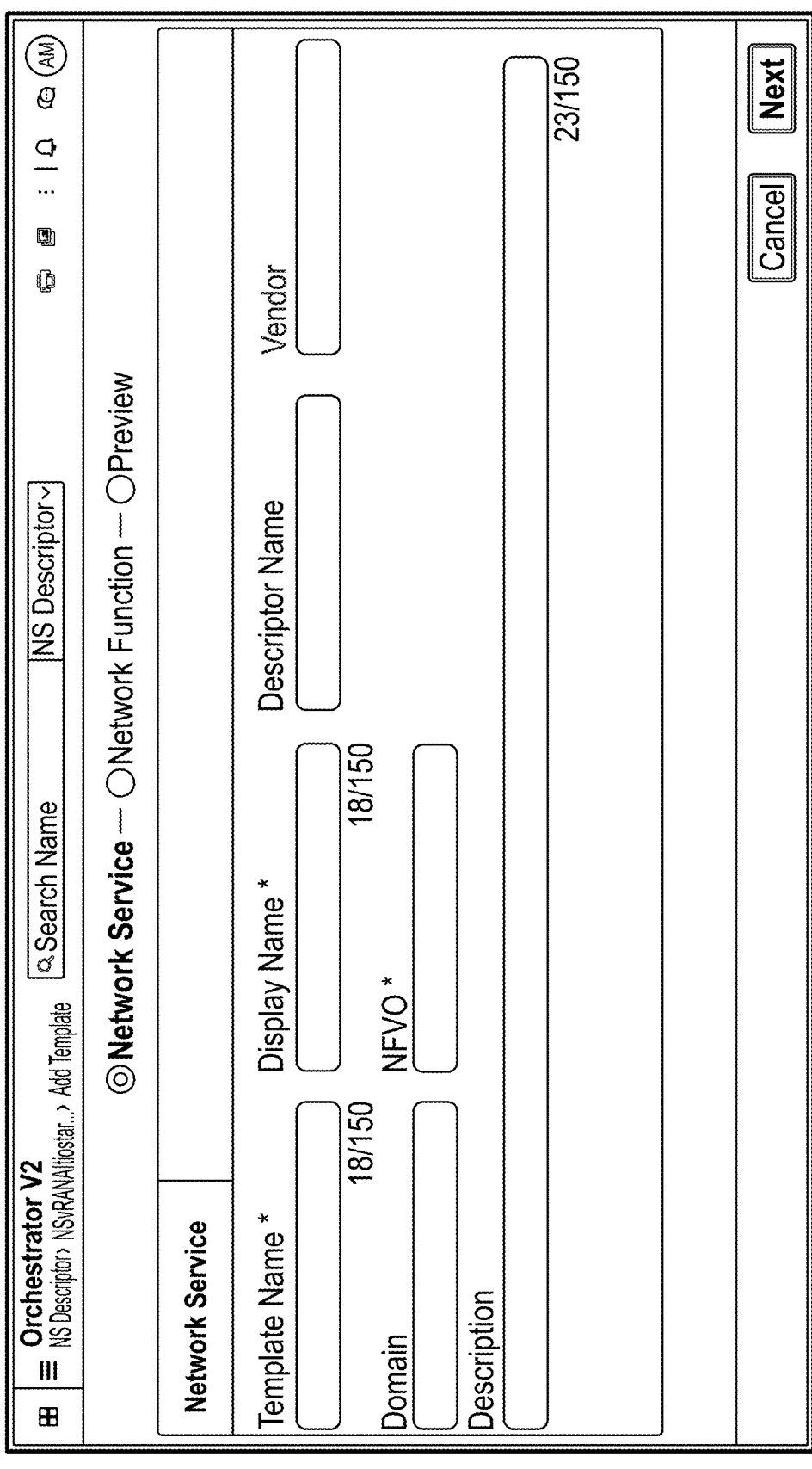

In some embodiments, generating the initial features of the NST includes receiving the user information through a GUI, e.g., GUI 300B depicted in FIG. 3B.

At operation 230, a CNF of the NST is integrated with an IP address manager. In some embodiments, integrating the CNF of the NST with the IP address manager includes receiving user information identifying the CNF, e.g., a CNF name or a selection from a list.

In some embodiments, integrating the CNF with the IP address manager includes receiving user information identifying the IP address manager, e.g., an IP address manager name or a selection from a list. In some embodiments, integrating the CNF with the IP address manager includes receiving user information identifying an IP template, e.g., a selection from a list of IP templates. In some embodiments, integrating the CNF with the IP address manager includes receiving user information including one or more search terms whereby a search of a database or other storage medium is performed.

In some embodiments, integrating the CNF with the IP address manager includes receiving the user information including an identifier of an IP pool, e.g., a selection from a list of IP pools.

Figure 3C:
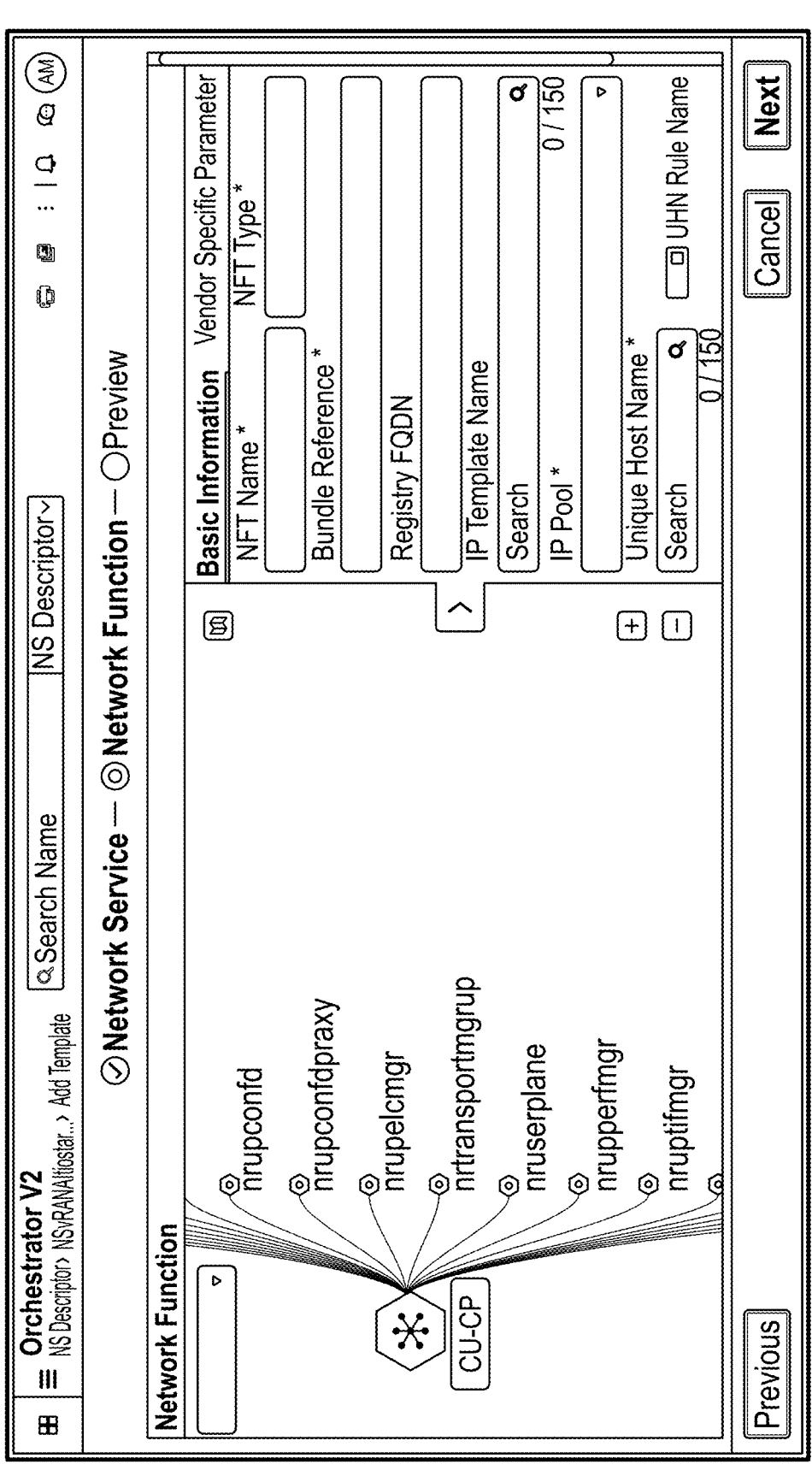

In some embodiments, integrating the CNF with the IP address manager includes receiving the user information through a GUI, e.g., GUI 300C depicted in FIG. 3C.

At operation 240, the CNF is integrated with a UHN manager. In some embodiments, integrating the CNF with the UHN manager includes receiving user information identifying the UHN manager, e.g., a UHN manager name or a selection from a list.

In some embodiments, integrating the CNF with the UHN manager includes receiving user information identifying a UHN rule name, e.g., a selection from a list of UHN rule names, whereby a set of naming rules is used by the UHN manager.

In some embodiments, integrating the CNF with the UHN manager includes receiving user information including one or more search terms whereby a search of a database or other storage medium is performed.

In some embodiments, integrating the CNF with the UHN manager includes receiving the user information through a GUI, e.g., GUI 300C depicted in FIG. 3C.

At operation 250, in some embodiments, the CNF is linked to a server cluster. In some embodiments, linking the CNF to the server cluster includes receiving the user information identifying one or both of a location type or a location of the server cluster.

In some embodiments, linking the CNF to the server cluster includes receiving the user information including a selection from a list. In some embodiments, receiving the user information including the selection includes generating a list of recommended server clusters, e.g., based on one or more server capability parameters.

In some embodiments, linking the CNF to the server cluster includes receiving the user information including one or more search terms whereby a search of a database or other storage medium is performed.

Figure 3D:
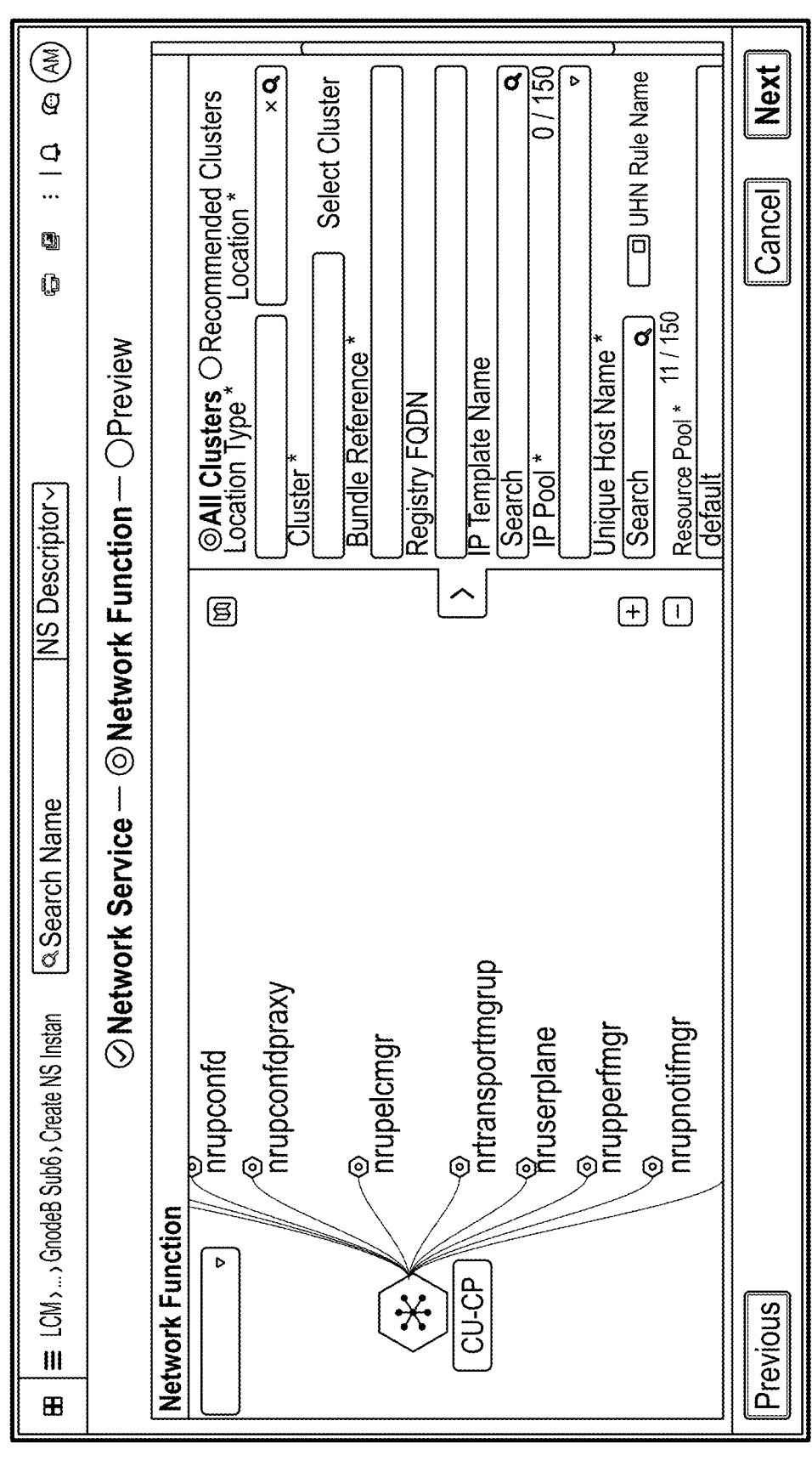
Figure 3E:
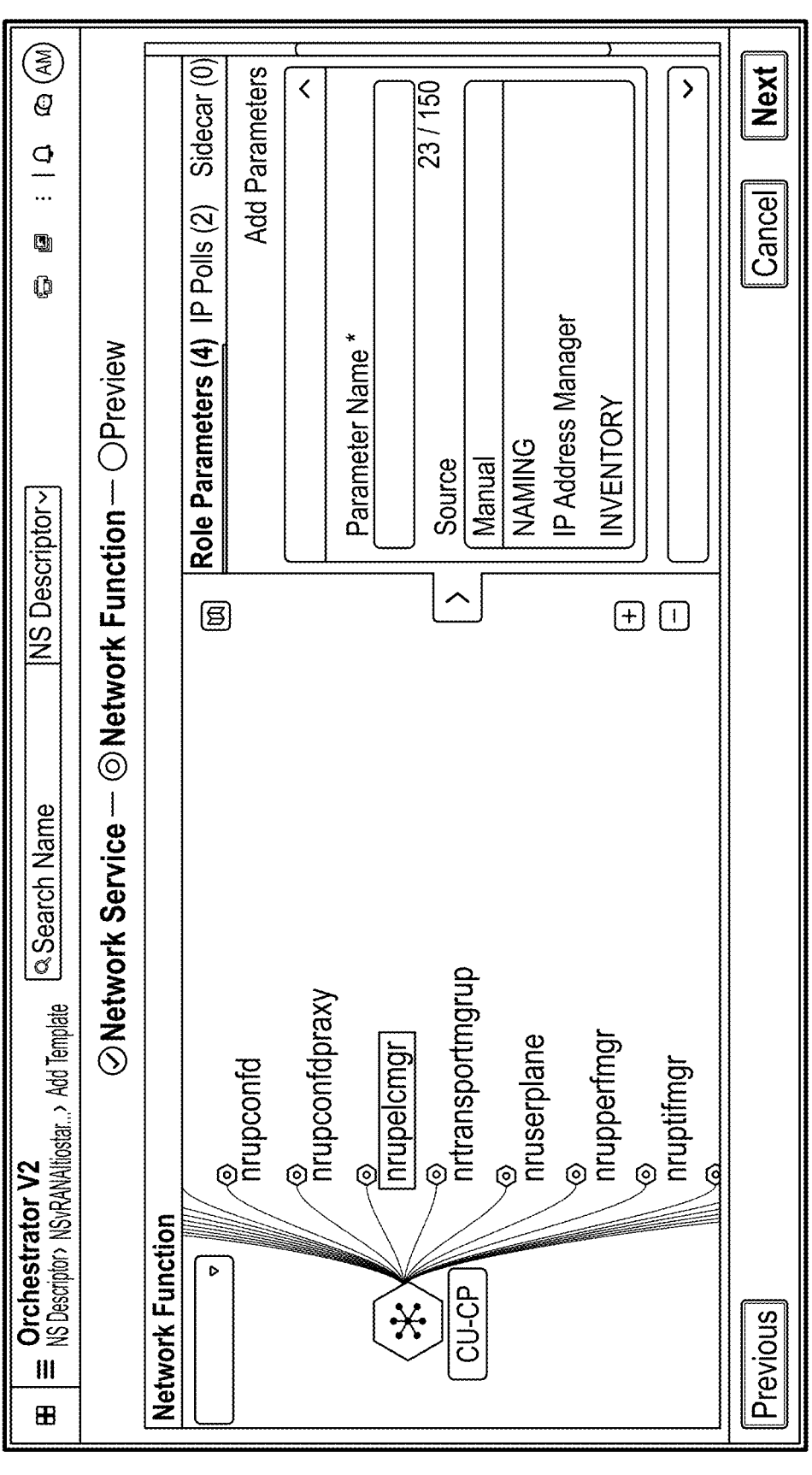

In some embodiments, linking the CNF to the server cluster includes receiving the user information through a GUI, e.g., GUI 300D depicted in FIG. 3D.

At operation 260, in some embodiments, the CNF is linked to a container image. In some embodiments, linking the CNF to the container image includes the container image corresponding to the server cluster selected in operation 250. In some embodiments, linking the CNF to the container image includes receiving the user information identifying one or both of a container image name or version.

In some embodiments, linking the CNF to the container image includes receiving the user information including a selection from a list. In some embodiments, linking the CNF to the container image includes receiving the user information including one or more search terms whereby a search of a database or other storage medium is performed.

At operation 270, in some embodiments, for each role of the CNF, details are defined. In some embodiments, defining the details includes receiving user information including one or more of a parameter name, dynamic value selection, IP address, hostname, or password information, or the like.

In some embodiments, defining the details includes receiving user information identifying a source of the details, e.g., a selection from a list.

In some embodiments, defining the details for each role includes receiving the user information identifying each role of multiple roles of the CNF, e.g., a selection from a list. In some embodiments, defining the details for each role includes receiving the user information through a GUI, e.g., GUI 300E depicted in FIG. 3E.

In some embodiments, defining the details includes defining the details including IP pool and DNS information. In some embodiments, defining the IP pool information includes receiving the user information identifying one or both of an IP address manager or an IP configuration ID, e.g., based on a selection from a list.

In some embodiments, defining the DNS information includes receiving the user information identifying one or more of a DNS registration, a DNS server type, or a DNS server zone, e.g., based on a selection from a list.

Figure 3F:
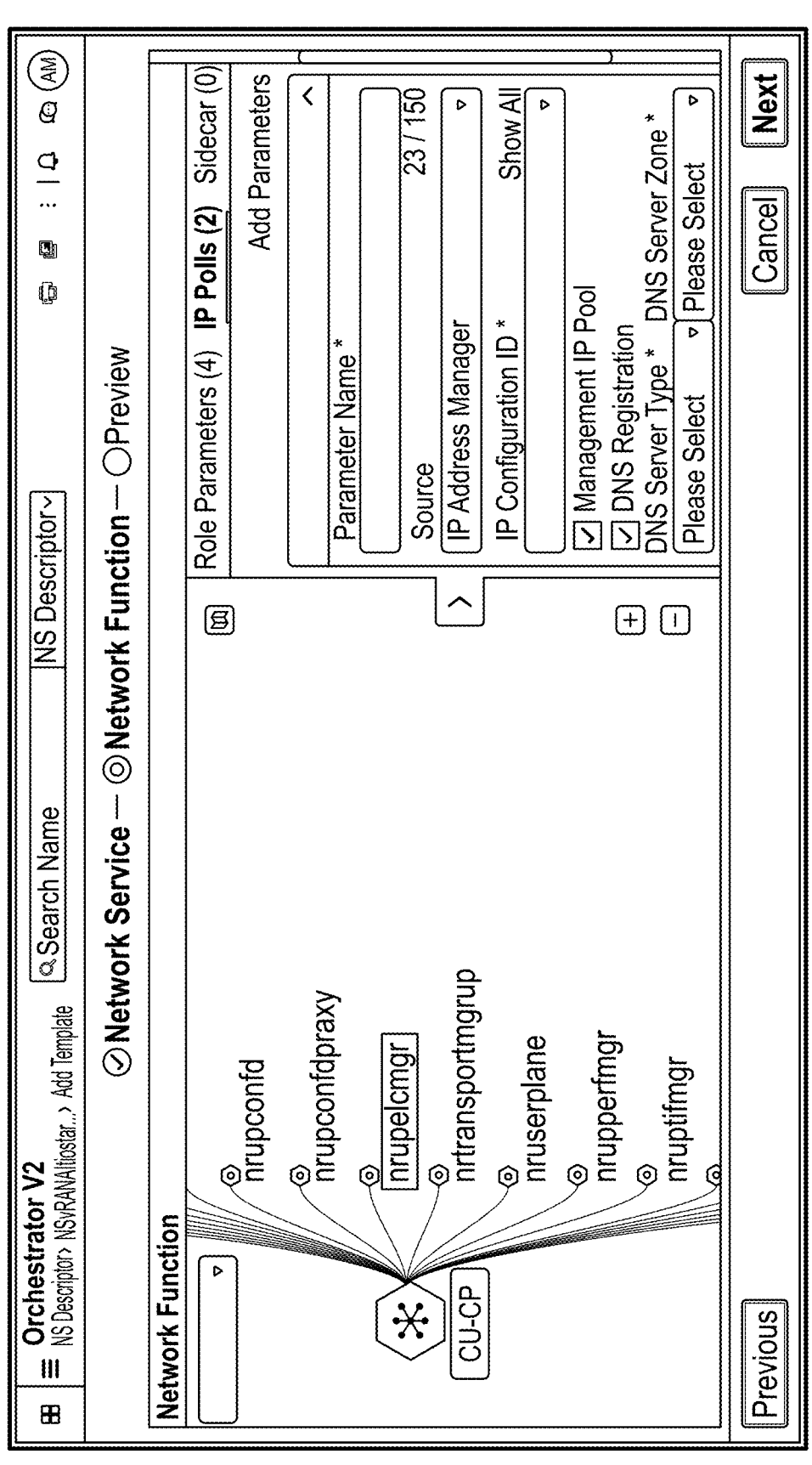

In some embodiments, defining the details including the IP pool and DNS information includes receiving the user information through a GUI, e.g., GUI 300F depicted in FIG. 3F.

At operation 280, some or all of operations 230-270 are repeated, and the NST is stored in a storage device. In some embodiments, the CNF identified in operation 230 is a first CNF of a plurality of CNFs of the NST, and method 200 includes, for each CNF of the plurality of CNFs, repeating one or more of operations 230-270.

In some embodiments, storing the NST in a storage device includes storing the NST in storage device 125 discussed above.

At operation 290, in some embodiments, an application is deployed using the stored NST. Deploying the application includes an orchestrator using the information stored in the template to launch an instance of the application in a communication system, e.g., system 100 discussed above.

In some embodiments, deploying the application includes using the orchestrator identified in operation 220.

By executing some or all of the operations of method 200, an NST is generated by including initial features, integrating one or more CNFs of the NST with an IP address manager, integrating the CNF(s) with a UHN manager, defining details of each role of a plurality of roles of the CNF(s), storing the NST in a storage device, in some embodiments linking the CNF(s) to one or both of a server cluster or a container image, in some embodiments defining the CNF role details by including IP pool and DNS information, and in some embodiments using the stored NST to deploy an application. A communication system, e.g., system 100 discussed above, configured to execute some or all of method 200 is thereby capable of automated application deployment so as to improve system efficiency compared to other approaches.

FIG. 4 is a functional block diagram of a computer or processor-based system 400 upon which or by which an embodiment is implemented.

Processor-based system 400 is programmed to facilitate network application implementation, as described herein, and includes, for example, bus 408, processing circuitry 402, also referred to a processor 402 in some embodiments, and memory 404 components.

In some embodiments, processor-based system 400 includes a communication mechanism such as bus 408 for transferring information and/or instructions among the components of processor-based system 400. Processing circuitry 402 is connected to bus 408 to obtain instructions for execution and process information stored in, for example, memory 404. In some embodiments, processing circuitry 402 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 402. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 402 performs a set of operations on information as specified by a set of instructions stored in memory 404 related to network application implementation. The execution of the instructions causes the processor to perform specified functions.

Processing circuitry 402 and accompanying components are connected to memory 404 via bus 408. Memory 404 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. Memory 404 also stores the data associated with or generated by the execution of the operations.

In one or more embodiments, memory 404, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 404 is also used by processing circuitry 402 to store temporary values during execution of processor instructions. In various embodiments, memory 404 includes a read only memory (ROM) or any other static storage device coupled to bus 408 for storing static information, including instructions, that is not capable of being changed by processing circuitry 402. Some memory is composed of volatile storage that loses the information stored thereon when power is lost. In some embodiments, memory 404 includes a non-volatile (persistent) storage device, such as a magnetic disk, optical disk, or flash card, for storing information, including instructions, that persists even when system 400 is turned off or otherwise loses power.

The term "computer-readable medium" as used herein refers to any medium that participates in providing information to processing circuitry 402, including instructions 406 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 407 include an orchestrator 416 including a NST generator 418, which correspond to orchestrator 122 and NST generator 214 discussed above with respect to FIGS. 1-3F and are therefore not further discussed. Instructions 407 also include a user interface 420, one or more sets of instructions configured to allow effective operation and control of system 400 by a user. In some embodiments, user interface 420 is configured to operate though one or more layers, including a human-machine interface (HMI) that interfaces machines with physical input hardware such as keyboards, mice, or game pads, and output hardware such as computer monitors, speakers, printers, and other suitable user interfaces.

In some embodiments, a computer-implemented method includes generating initial features of a NST, integrating a CNF of the NST with an IP address manager, integrating the CNF with a UHN manager, defining details of each role of a plurality of roles of the CNF, and storing the NST in a storage device.

In some embodiments, an apparatus includes a user interface, a memory having non-transitory instructions stored therein, and a processor coupled to the memory, and being configured to execute the instructions, thereby causing the apparatus to receive user instructions through the user interface; and in response to the user instructions, generate initial features of a NST, integrate a CNF of the NST with an IP address manager, integrate the CNF with a UHN manager, define details of each role of a plurality of roles of the CNF, and store the NST in a storage device.

In some embodiments, a computer-readable medium includes instructions executable by a controller of an orchestrator to cause the controller to perform operations including generating initial features of a NST, integrating a CNF of the NST with an IP address manager, integrating the CNF with a UHN manager, defining details of each role of a plurality of roles of the CNF, and storing the NST in a storage device.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A method executed by a processor, the method comprising:
   generating initial features of a network service template (NST);
   integrating a cloud-native network function (CNF) of the NST with an internet protocol (IP) address manager;
   integrating the CNF with a unique host name (UHN) manager wherein integrating comprises receiving user information identifying the UHN manager;
   defining details of each role of a plurality of roles of the CNF; and
   storing the NST in a storage device.

2. The method of claim 1, wherein the generating the initial features of the NST comprises generating at least one initial feature from a network service descriptor (NSD).

3. The method of claim 1, wherein the generating initial features of the NST comprises identifying a virtual network function manager.

4. The method of claim 1, further comprising linking the CNF to one or both of a server cluster or a container image.

5. The method of claim 1, wherein
   the CNF is a first CNF of a plurality of CNFs of the NST, and
   the method further comprises, for each CNF of the plurality of CNFs, repeating each of the integrating the CNF with the IP address manager, the integrating the CNF with the UHN manager, and the defining the details of each role of the plurality of roles of the CNF.

6. The method of claim 1, further comprising deploying an application using the stored NST.

7. An apparatus, comprising:
   a user interface;
   a memory having non-transitory instructions stored therein; and
   a processor coupled to the memory, and being configured to execute the instructions, thereby causing the apparatus to:
   receive user instructions through the user interface; and
   in response to the user instructions:
      generate initial features of a network service template (NST);
      integrate a cloud-native network function (CNF) of the NST with an internet protocol (IP) address manager;
      integrate the CNF with a unique host name (UHN) manager wherein integrating comprises receiving user information identifying the UHN manager;
      define details of each role of a plurality of roles of the CNF; and
      store the NST in a storage device.

8. The apparatus of claim 7, wherein the instructions further cause the apparatus to, in response to the user instructions:
   generate at least one of the initial features from a network service descriptor (NSD).

9. The apparatus of claim 7, wherein the instructions further cause the apparatus to generate the initial features of the NST comprising an identifier of a virtual network function manager.

10. The apparatus of claim 7, wherein the instructions further cause the apparatus to, in response to the user instructions:
   link the CNF to one or both of a server cluster or a container image.

11. The apparatus of claim 7, wherein
   the CNF is a first CNF of a plurality of CNFs of the NST, and
   the instructions further cause the apparatus to, in response to the user instructions:
      for each CNF of the plurality of CNFs, repeat each of integrating the CNF with the IP address manager, integrating the CNF with the UHN manager, and defining the details of each role of the plurality of roles of the CNF.

12. The apparatus of claim 7, wherein the instructions further cause the apparatus to, in response to the user instructions:
   deploy an application using the stored NST.

13. A non-transitory computer-readable medium including instructions executable by a controller of an orchestrator device to cause the controller to perform operations comprising:
   generating initial features of a network service template (NST);
   integrating a cloud-native network function (CNF) of the NST with an internet protocol (IP) address manager;
   integrating the CNF with a unique host name (UHN) manager wherein integrating comprises receiving user information identifying the UHN manager;

defining details of each role of a plurality of roles of the CNF; and storing the NST in a storage device.

14. The non-transitory computer-readable medium of claim 13, wherein the instructions are executable by the controller of the orchestrator device to cause the controller to generate at least one of the initial features from a network service descriptor (NSD).

15. The non-transitory computer-readable medium of claim 13, wherein the instructions are executable by the controller of the orchestrator device to cause the controller to generate the initial features of the NST by identifying a virtual network function manager.

16. The non-transitory computer-readable medium of claim 13, wherein the instructions are executable by the controller of the orchestrator device to cause the controller to link the CNF to one or both of a server cluster or a container image.

17. The non-transitory computer-readable medium of claim 13, wherein the CNF is a first CNF of a plurality of CNFs of the NST, and the instructions are executable by the controller of the orchestrator device to cause the controller to, for each CNF of the plurality of CNFs, repeat each of the integrating the CNF with the IP address manager, the integrating the CNF with the UHN manager, and the defining the details of each role of the plurality of roles of the CNF.

* * * * *